United States Patent Office 3,546,243
Patented Dec. 8, 1970

3,546,243
REACTION PRODUCTS OF DIKETENE WITH CERTAIN SUBSTITUTED N-(ALKYLAMINO) SUCCINIMIDES
Keith Coupland, Hornsea, England, assignor, by mesne assignments, to Orobis Limited, Piccadilly, London, England, a British company
No Drawing. Filed Sept. 21, 1967, Ser. No. 669,405
Claims priority, application Great Britain, Oct. 1, 1966, 43,969/66
Int. Cl. C07d 27/10
U.S. Cl. 260—326.3    6 Claims

ABSTRACT OF THE DISCLOSURE

The invention is novel compounds produced by reaction of diketene with certain alkyl or alkenyl substituted derivatives of N-(alkylamino) succinimide of specified formula. The additives find application as lubricant additives.

---

The present invention relates to certain novel compounds and their uses, particularly their use as ashless lubricant additives.

The present invention provides novel compounds produced by the reaction of diketene with a succinimide of formula $$R_1\text{-}CH(CH_2)\text{-}(CO)_2\text{N}\text{-}[(CH_2)_n NH]_m (CH_2)_n NH(CH_2)_n NH_2$$

I or $$R_1\text{-}CH(CH_2)\text{-}(CO)_2\text{N}\text{-}[(CH_2)_n NH]_p (CH_2)_n NH(CH_2)_n NH[(CH_2)_n NH]_q (CH_2)_n N\text{-}(CO)_2\text{-}CH(CH_2)R_2$$

II wherein $R_1$ and $R_2$ are long chain alkyl or alkenyl radicals which may be the same or different, $n$ is an integer having a value 2 or 3, $m$ is an integer having a value in the range 0 to 8 and $p$ and $q$ are integers having values such that the total $(p+q)$ lies in the range 0 to 8.

The radicals $R_1$ and $R_2$, which may be the same or different, must be long chain radicals and may contain between 20 and 200 carbon atoms, preferably between 30 to 150. The radicals are commonly derived from polyolefins such as polyethylene, polypropylene, polybutylene and polyisobutylene, although the may be derived from any substantially aliphatic hydrocarbon. It is particularly preferred to use a succinimide of Formula I in which $R_1$ is a polyisobutenyl radical having about 70 carbon atoms in the chain.

The compounds of Formula I and II may be prepared by reaction in known manner of succinic acid or anhydride containing substituent $R_1$ or $R_2$ radicals with a polyamine. The polyamine may be a polymer of ethylene diamine when $n$ has a value 2, or of 1,3-propylene diamine when $n$ has the value 3. Suitable polymers are, for example, tetraethylene pentamine, when $m$ or $(p+q)$ will have the values 2 or 1 respectively, or tripropylene tetramine, when $m$ or $(p+q)$ will have the values 1 or 0 respectively. When equimolar amounts of succinic acid or anhydride and polyamine are used, compounds of Formula I are largely produced. When two moles of acid or anhydride are used per mole of polyamine, compounds of Formula II are largely produced.

To prepare the compounds of the invention, the succinimide may be dissolved in a suitable solvent, for example toluene, and diketene added, preferably slowly, to the solution. A mildly exothermic reaction occurs and when completed water is removed suitably by azeotropic distillation with the solvent. The product is then isolated by removal of the solvent, suitably by distillation under reduced pressure.

The compounds of the invention are useful as ashless dispersant additives in lubricant compositions, and show improved characteristics with respect to copper corrosion when compared with certain prior art dispersant additives. Accordingly the invention further comprises lubricant compositions containing the novel compounds.

The invention is further illustrated by the following examples.

Example 1

A 3 litre flask was charged with compound of Formula I in which $R_1$ was $C_{70}$ polybutene and $n$ had the value 2 and $m$ had the value 2 (1503.5 gm.), and toluene (200 ml.). The flask was equipped for stirring, diketene addition and removal of water via a Dean and Stark distillation head. The solution was warmed to 30° C. and diketene added slowly, when a mildly exothermic reaction took place. When the addition was complete the reaction mixture was refluxed and water of reaction (8.5 ml.) was removed via the Dean and Stark head. The product was isolated by removal of solvent under reduced pressure and found to contain 2.0% nitrogen.

Example 2

A compound of Formula I (1 mole) in which $R_1$ was derived from polyisobutene containing 70 carbon atoms, $n$ had the value 2 and $m$ the value 2 was reacted with diketene (2.5 moles) using the same procedure as described in Example 1. The product contained 2.14% nitrogen.

Example 3

The product of Example 1 was evaluated by comparison with the compound of Formula II in which $n$ had the value 2 and R was $C_{70}$, a known dispersant additive for lubricating oils in a Petter W1 Oil oxidation and copper lead corrosion engine test, modified by extending the test duration from 36 to 48 hours. The additives were evaluated in a lubricant composition comprising:

|   | Percent |
|---|---|
| Zinc dialkyldithiophosphate | 0.5 |
| Basic additive (metal aryl carboxylate) | 3.0 |
| Dispersant under test | 2.0 |

In solvent-refined high viscosity index paraffinic SAE 30 grade (a Middle East lubricating oil).

The results of the test are given in the table below.

TABLE 1

| Dispersant | Total bearing[1] weight loss, mg. | | Piston merit rating[2] | |
|---|---|---|---|---|
| | 36 hr. | 48 hr. | Skirt | Under crown |
| Compound of Formula I | 22.7 | 34.9 | 10 | 8 |
| Product of Example 1 | 9.2 | 13.5 | 10 | 8 |

[1] A copper lead bearing.
[2] 36 Hr. rating out of 10=as new.

A pass result=Skirt not less than 9.5; undercrown not less than 6.5.

As can be seen the pistons remain acceptable and the total bearing weight loss was much reduced with the novel compound.

Exmple 4

The products of Examples 1 and 2 were evaluated in a laboratory copper-lead bearing test and compared with a known dispersant additive for lubricating oils (Additive A) having a formula according to Formula I in which

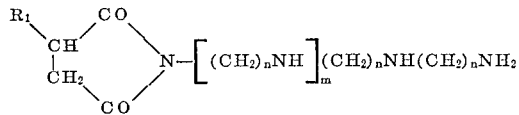

$R_1$ was $C_{70}$ and $n$ and $m$ had the values 2. The additives were evaluated in a lubricant composition comprising:

| | Percent |
|---|---|
| Zinc dialkyl dithiophosphate | 0.5 |
| Basic detergent additive (metal aryl carboxylate) | 3.0 |
| Dispersant | 2.0 | in solvent-refined high viscosity index paraffinic SAE 30 grade mineral oil.

The test is carried out in apparatus which consists of a glass cell, equipped with a stirrer. The stirrer is equipped with a cylindrical mild steel rotor which clears the bearings whose corrosion is being measured, but provides sufficient oil shear at the bearing surface to remove deposits. The glass cell has provision for air inlet, air outlet, oil circulation outlet and a side tube containing the coking panel and mounting. The coking panel mounting is drilled to take a heating element, resistance thermometer and thermocouple. Copper-lead bearings, of the type used in the Petter W1 test engine, are seated in the lower portion of the cell which is designed to hold them firmly. The test cell is immersed in an oil bath, the temperature of which can be controlled at the desired bulk oil temperature. Coking panel temperatures are controlled by a resistance thermometer operating an electronic relay, the temperature of the panel being determined by the thermocouple. Oil is fed over the coking panel from the cell by a micropump and returned to the cell. Stirring is held constant at the required rate by controlling the motor voltage. Visual indication may be made using a simple tachometer device. All temperatures are recorded continuously on an electrically driven potentiometric recorder.

The oil under test is charged to the cell with 0.025% of iron octoate. Bearings are cleansed of oil, dried and weighed, then seated in the cell. The bath and coking panel are brought to the required temperature and oil circulation started. Air is introduced via a flow meter and agitation begun; timing of the experiment commences from the start of the air flow. The onset of corrosion can be accurately determined by removing the bearings at intervals and weighing them after cleansing of oil and drying.

A bearing weight loss to correspond with acceptable Petter W1 performance is less than 20 mg.

The results of these tests in an eight hour run are given in Table 2 below.

TABLE 2

| Dispersant: | Bearing wt. loss (mg.) |
|---|---|
| Additive A | 23.5 |
| Material of Example 1 | 2.0 |
| Material of Example 2 | NIL |

I claim:
1. A compound produced by the reaction of diketene with a succinimide of formula

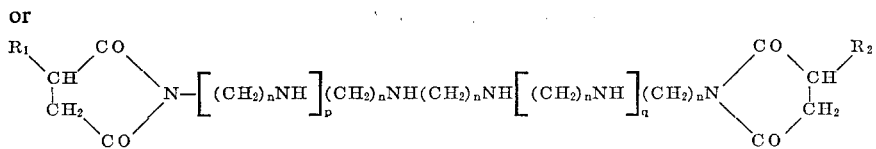

wherein $R_1$ and $R_2$ are long chain alkyl or alkenyl radicals which may be the same or different and which contain between 20 and 200 carbon atoms, $n$ is an integer having a value 2 or 3, $m$ is an integer having a value in the range 0 to 8 and $p$ and $q$ are integers having values such that the total $(p+q)$ lies in the range 0 to 8, the reaction being carried out in the presence of a solvent for said succinimide.

2. Compound according to claim 1 wherein the radicals $R_1$ and $R_2$ are the same.

3. Compound according to claim 1 wherein the radicals $R_1$ and $R_2$ are derived from polyethylene, polypropylene, polybutylene and polyisobutylene.

4. Compound according to claim 1 produced by the reaction of diketene with a succinimide of Formula I in which $R_1$ is a polyisobutenyl radical having 70 carbon atoms in the side chain.

5. Compound according to claim 1 wherein the integer $m$ has the value 1 or 2.

6. Compound according to claim 1 wherein the total $(p+q)$ has the value 1 or 0.

References Cited

UNITED STATES PATENTS 3,444,170   5/1969   Norman et al.   260—326.3X

NICHOLAS S. RIZZO, Primary Examiner

J. A. NARCAVAGE, Assistant Examiner

U.S. Cl. X.R.

252—51.5